United States Patent [19]

Thornton

[11] 4,397,228
[45] Aug. 9, 1983

[54] SELF-ADJUSTING APPARATUS FOR SLITTING PEANUTS

[75] Inventor: Robert L. Thornton, Moultrie, Ga.

[73] Assignee: Seabrook Blanching Corporation, Albany, Ga.

[21] Appl. No.: 411,235

[22] Filed: Aug. 25, 1982

Related U.S. Application Data

[63] Continuation of Ser. No. 159,293, Jun. 13, 1980, abandoned.

[51] Int. Cl.³ .......................... B02B 3/08; A23N 5/01
[52] U.S. Cl. .......................................... 99/541; 99/576; 99/589; 99/621
[58] Field of Search .......... 99/537, 541, 550, 574–576, 99/589, 623, 621, 628, 629; 241/232; 198/523; 100/168; 83/415

[56] References Cited

U.S. PATENT DOCUMENTS 3,964,379 6/1976 Gardner ............................ 99/589 X
4,168,660 9/1979 Zelle .................................... 100/168
4,194,445 3/1980 Gemsjager ............................ 99/618

*Primary Examiner*—Philip R. Coe
*Assistant Examiner*—Timothy F. Simone
*Attorney, Agent, or Firm*—Morse, Altman & Dacey

[57] ABSTRACT

Apparatus is provided for slitting the skins of shelled peanuts, or the like, without splitting the nuts. Peanuts are fed in a single stream into the bite of a pair of rollers mounted one above the other for rotation about parallel horizontal axes. The rollers are driven to carry the stream of nuts into engagement with slitting elements disposed on both sides of the bite of the rollers. The upper roller is carried by a yoke pivoted to a drive shaft and is adapted to rise and fall to and away from the lower roll according to the size of the nut being fed therethrough whereby a substantially constant gripping pressure is applied to the nuts irrespective of the size of the nut. A power drive system connects between the drive shaft and the upper roll.

5 Claims, 6 Drawing Figures

SELF-ADJUSTING APPARATUS FOR SLITTING PEANUTS

This is a continuation of application Ser. No. 159,293 filed on June 13, 1980, abandoned.

BACKGROUND OF THE INVENTION

1. Field of the Invention

This invention relates generally to peanut processing equipment and more particularly is directed towards self-adjusting apparatus for use in slitting the skins of peanuts.

2. Description of the Prior Art

In many food products in which peanuts are used, the practice has been to employ blanched peanuts. A blanched peanut is one which has both its hard outer shell as well as its inner dark, reddish brown skin removed. Blanching refers to that part of the peanut process in which this inner dark skin is removed.

According to present practice, nut blanching may be carried out by first slitting the outer skin of the nuts substantially from one end to the other end and along both sides. After the skins have been slit in this fashion, they are then loosened by dousing the nuts in a bath of scalding water in a process known as water blanching, wherein the water-soaked nuts have their skins removed by passing the nuts between a pair of opposing, oscillating rubbing surfaces. Another process by which the dark skin is removed is through a dry blanching operation in which nuts skins are first slit and the nuts are then fed onto a moving belt which carries the nuts against a fixed abrasive baffle, causing the nuts to spin and the skins to be removed thereby. Blanching machines of the latter character are more fully described in U.S. Pat. Nos. 3,196,914 and 3,951,057. The equipment to slit the peanut skins without breaking or splitting the nuts is shown in U.S. Pat. Nos. 3,217,764 and 3,964,379. In these patents the slitting equipment has involved the use of a pair of upper and lower rollers mounted for rotation about horizontal parallel axes and which define a gap adapted through which each nut in a stream of nuts is fed. On either side of the gap are slitting elements in the form of blades which are spring-loaded and which form a slit in the nut skin from end to end of the nuts as they are fed through the bite of the rollers.

In view of the fact that peanuts vary in size, not only from one batch to another but also within the same batch, considerable care must be taken to maintain a proper gap size between the two rollers in order to prevent splitting the nuts from the pressure of the rollers if the gap is too small, or from loss of feed control in the event that the gap is made to large. Typically, the gap is set to the average size of the nuts being fed through the equipment at the start of each batch of nuts being processed. In U.S. Pat. No. 3,217,764 the gap between each pair of rolls was individually set for the average nut size while in U.S. Pat. No. 3,964,379 the gaps for several rolls in a single machine were set by operating a lever. In either event, the arrangement was not entirely satisfactory from the standpoint of the time and skill involved in adjusting each pair of rolls or each set of rolls in a particular machine. In practice, slitting machines of this type are provided in large numbers in a processing plant and a considerable amount of time is required to adjust each machine to a particular size. Even after the size has been set, the machines must be monitored on a regular basis because of possibility of clogging from oversized nuts trying to get through the rolls or nuts spilling off the rolls because they are undersized.

Accordingly, it is an object of the present invention to provide improvements in machines for slitting the skins of peanuts and the like.

Another object of this invention is to provide self-adjusting equipment for use in slitting the skins of peanuts and the like in a peanut blanching operation.

SUMMARY OF THE INVENTION

This invention features apparatus for slitting the skins of shelled peanuts and the like, comprising a pair of rolls mounted one above the other for rotation about horizontal parallel axes and defining a gap therebetween through which nuts are fed in a single stream by suitable peanut feeding means such as a vibratory feeder. The skins of individual nuts gripped by the rollers and carried between the slitting elements are slit from one end to the other of the nut. The upper and lower rollers provide the means for gripping and feeding the nuts against the slitting blades.

The upper roll is carried by a pivot mount offset from and parallel to the axes of rotation of the lower roll and by its own weight the upper roll is biased towards the lower roll to provide both gripping pressure to the nut and self-adjustment action. Drive means are provided for rotating the upper and lower rolls to carry the nuts past the slitters.

DETAILED DESCRIPTION OF THE PREFERRED EMBODIMENT

Figure 1:
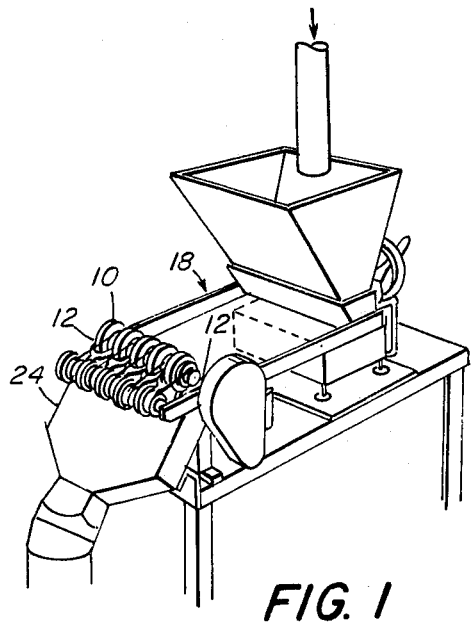
FIG. 1 is a view in perspective of a nut skin slitting apparatus made according to the invention.
Figure 4:
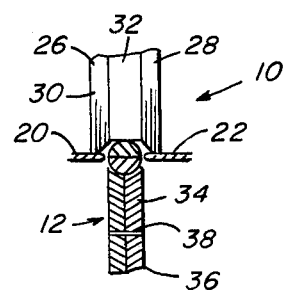
FIG. 4 is a detailed front elevation showing the top and bottom rolls and the slitting blades.
Figure 5:
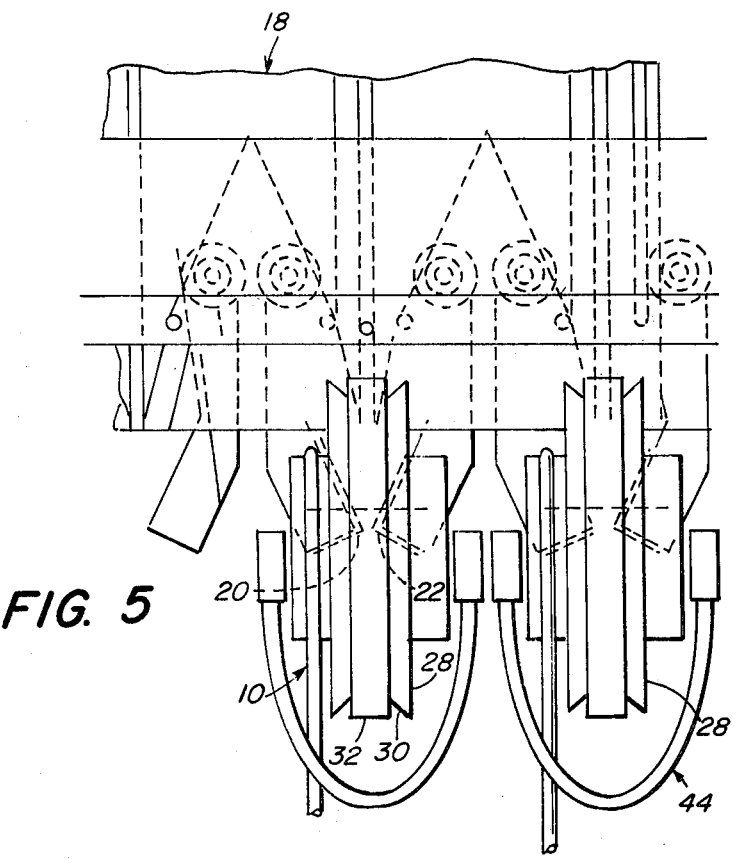
FIG. 5 is a fragmentary top plan view of the apparatus.
Figure 2:
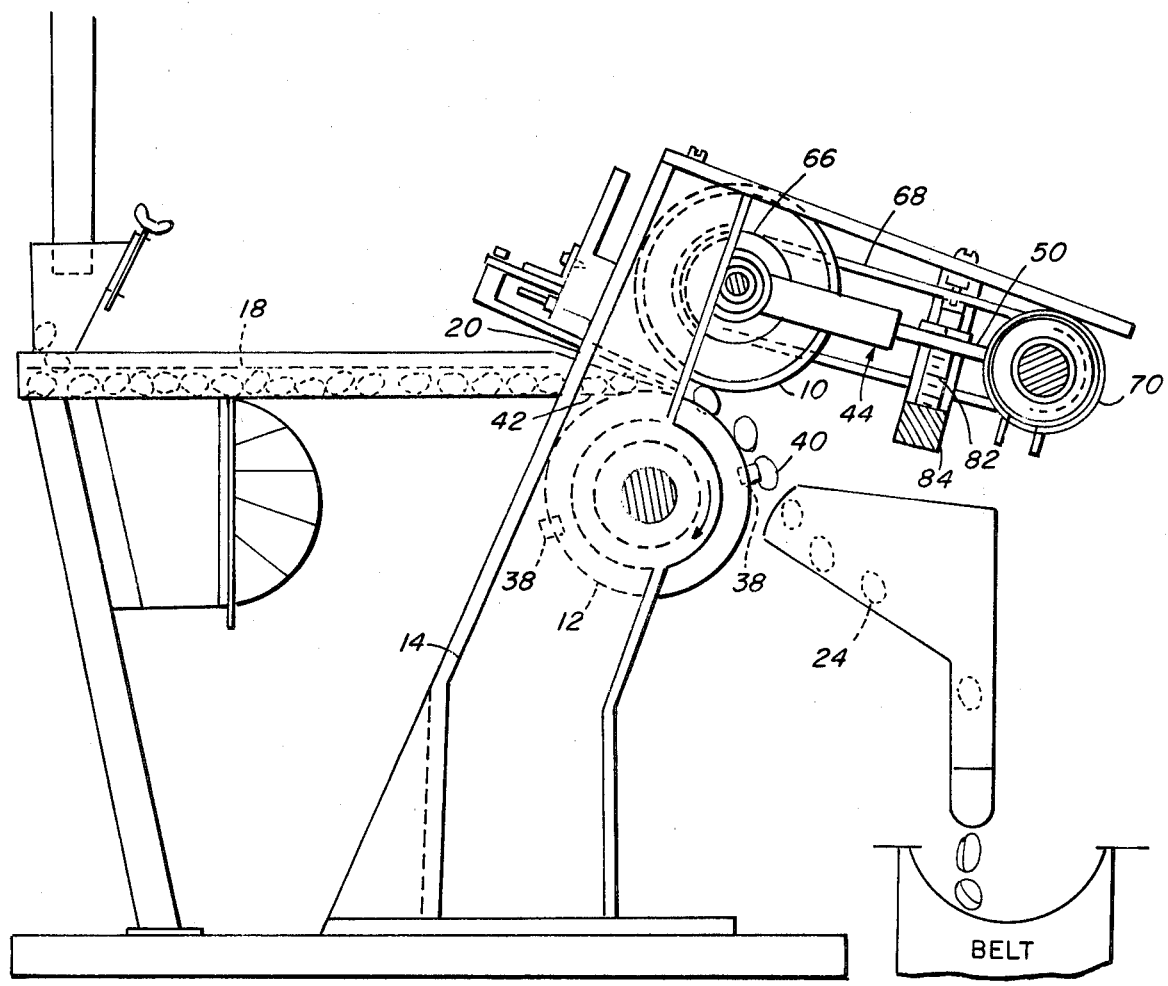
FIG. 2 is a detailed sectional view in side elevation of the apparatus.
Figure 6:
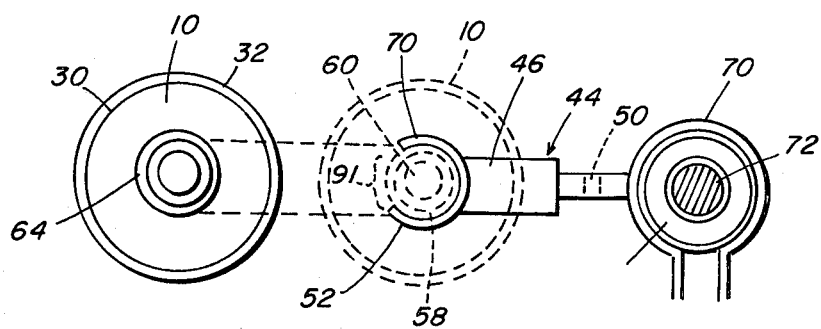
FIG. 6 is a detailed side view of the top roll assembly.

Referring now to the drawings, the machine for slitting nut skins is generally organized about a pair of rolls 10 and 12 arranged coplanar to one another, one above the other and mounted to a support 14 for rotation about horizontal parallel axes. As best shown in FIG. 2, the upper roll 10 is offset slightly forwards of the lower roll 12 so as to provide space on the top portion of the lower roll 12 wherein a shelled nut may be seated. Both rolls are driven in opposite directions as indicated by the arrows in FIG. 2 so that nuts, such as peanuts, fed into the bits of the two rolls by means of a vibratory feeder, or the like, generally indicated by reference character 18, will be gripped by the peripheral edges of the rolls and carried between a pair of cutting elements 20 and 22, as best shown in FIGS. 4 and 5. As the nut is carried between the cutting elements, the skin will be slit from one end to the other on both sides thereof. After the nut has passed out of engagement with the cutting elements, it will be discharged down a chute 24 and delivered to the next stage of the blanching operation as by a belt 25.

In the illustrated embodiment, the upper roll 10 is formed from a pair of annular metal plates 26 and 28, having inwardly bevelled edges 30 and sandwiching therebetween a resilient annulus 32 of slightly greater diameter than the plates. Preferably the annulus 32 is fabricated from a sponge rubber or similar resilient material. The lower roll 12 preferably is fabricated from a rigid material, such as metal or the like, and is of generally the same size as the upper roll 10. However, the lower roll 12 is formed with a V-groove 34 about its peripheral edge with a plurality of teeth 36 or other frictional elements formed on the face of the groove 34.

Disposed at 180° intervals about the roll 12 are abutments 38 located on the peripheral edge of the roll and spanning the groove 34. The function of the abutments 38 is to knock free any nuts which may become lodged between the cutting elements 20 and 22.

The upper roll 10 is offset slightly forward of the lower roll 12 so that individual peanuts 40, delivered in a steady single stream by the vibratory feeder 18, will be delivered one by one over a lip 42 into the bite of the two rollers 10 and 12 to carry them between the slitting knives 20 and 22 and thereby slit the dark outer skin of each nut substantially from one end to the other. The nuts must be held with sufficient pressure to carry them between the knives 20 and 22 but not under such pressure as would crush or split the nuts.

In accordance with the present invention, the upper roll 10 is mounted to float in a vertical plane with respect to the lower roll whereby the gap between the two rolls will automatically adjust according to changes in size, not only between different lots of peanuts, but also for individual kernel size variations. In the illustrated embodiment, the floating arrangement for the upper roll 10 is provided by means of a bracket or yoke 44 formed with U-shaped outer arms 46 and 48 and an inner leg 50. The arms 46 and 48 rotatably support the upper roll 10 by means of a pair of C-shaped bushings 52 and 54 one at each end of the arms 46 and 48 each bushing carrying a bearing 56 and 58. The C-shaped bushings 52 and 54 allow quick and easy replacement of the upper roll 10, as needed. The bearings 56 and 58 are mounted to a shaft 60 on which is also mounted a pair of hubs 62 and 64 on either side of the upper roll 10. The hubs 62 and 64 are secured in driving engagement to the shaft 60 while the shaft 60 rotates freely within the bearings 56 and 58.

Figure 3:
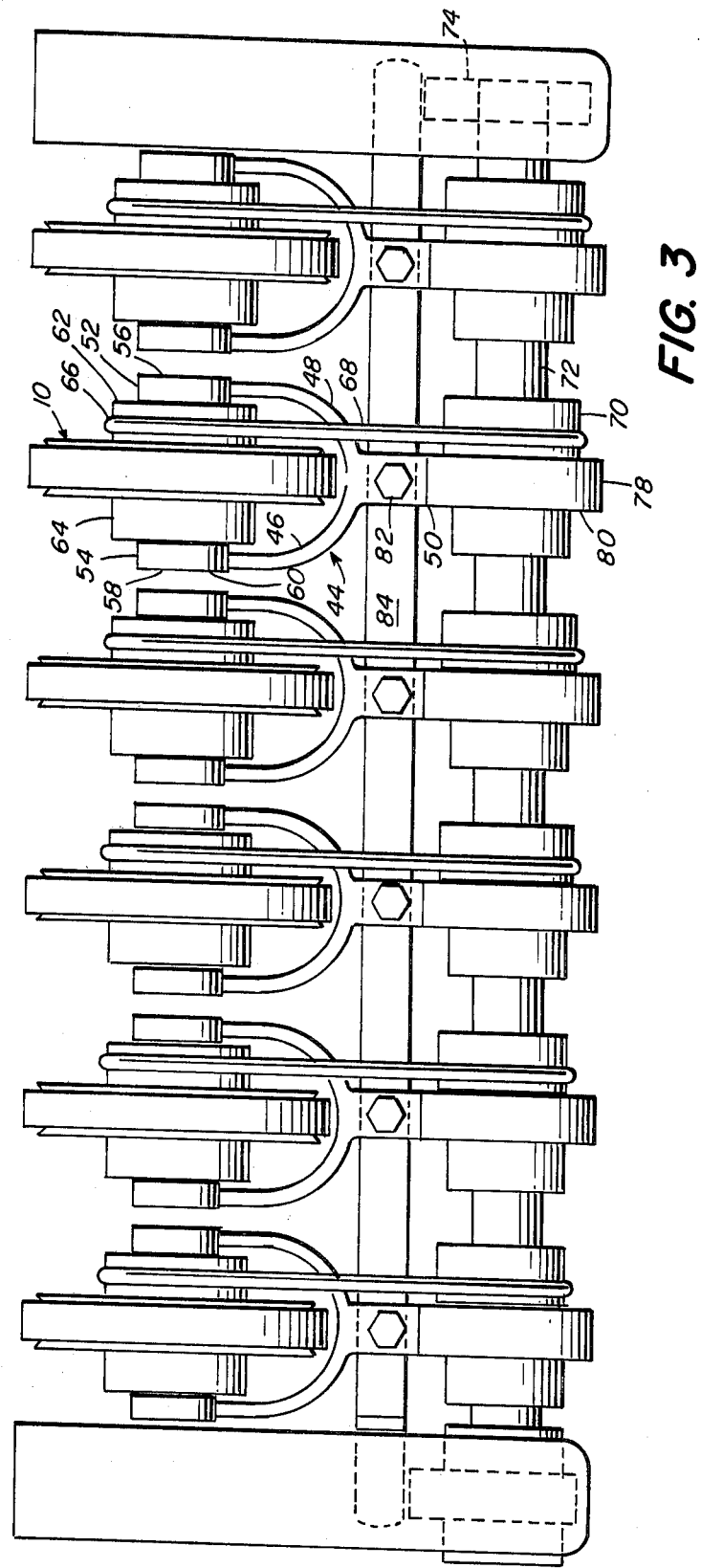
FIG. 3 is a top plan view thereof.

The right hand hub 62, as shown in FIG. 3, is formed with an annular groove 66 to serve as a pulley for an O-ring drive belt 68 looped thereover. The belt 68 extends forwardly and rearwardly to drivingly engage a pulley 70 locked to a drive shaft 72. The drive shaft 72 extends parallel to the axis of rotation of each of the rolls and may be driven by a motor mounted below the vibratory feeder and connected thereto by means of a suitable drive coupling system such as a belt and pulley, gear and spocket, or the like. The same drive arrangement may be used to operate the lower rolls 12. The ends of the drive shaft 72 are mounted to the support 14 by bearings 74 and 76.

When the drive shaft 72 is rotating it transmits power through the pulley 70 to the belt O-ring 68 and to the hub 62 which thereby rotates the upper roll 10.

The inner leg 50 of the bracket is formed into a C-shaped clamp 78 mounted over a bearing 80 assembled onto the drive shaft 72. Because of the bearing connection between the drive shaft and the clamp, the bracket itself is not moved by the rotation of the shaft 72, but rather rests under the force of gravity with the roll 10 floating in closely spaced relation to the roll 12. The roll 10 is kept out of direct contact with the roll 12 by means of an adjustable screw stop 82 which is threaded through the leg 50. When there are no peanuts between the rolls the lower end of the stop 82 is adapted to rest against the top of a cross-bar 84 mounted to the frame 14 and extending across the width of the machine below the brackets, as best shown in FIGS. 2 and 3. By adjusting the screw 82 the rest position of the roll 10 may be raised or lowered.

The pivot point of the bracket 44 is about the center of the drive shaft 72. The roll 10 is biased downwardly by gravity to apply a relatively light pressure against the nut 40 being fed by the rolls 10 and 12 between the slitting elements. Since the bracket is free to pivot up and down, the gap between the roll 10 and 12 will constantly vary according to the size of the particular nut passing between the two rolls. Thus, each nut will be uniformly gripped regardless of its size and there is no need to adjust the gap each time a new batch of nuts is to be processed. By eliminating the need to manually adjust the gap between the two rolls, there is a significant savings both in time and labor involved each time a different grade or variety of nuts is being processed. The apparatus automatically adjusts the gap between the rolls, not only for changes between lots of peanuts but also for individual kernel size variations. As another advantage, a higher percentage of nuts with two good slits is ensured. This will, in turn, improve the quality of the finished product by reducing the number of unblanched peanuts which would have to be recycled and reducing the percentage of split peanuts in the finished product.

While the invention has been described with particular reference to the illustrated embodiment, numerous modifications thereto will appear to those skilled in the art.

Having thus described the invention, what I claim and desire to obtain by Letters Patent of the United States is:

1. Apparatus for slitting the skins of nuts, including
   (a) a pair of rolls disposed in a vertical plane one above the other and defining a bite therebetween,
   (b) feed means for delivering said nuts in a single steady stream into the bite of said rolls,
   (c) slitting elements disposed on opposite sides of said bite in a plane generally perpendicular to the plane of said rolls for slitting the skins of nuts carried by said rolls between said elements,
   (d) resilient mounting means supporting the upper of said rolls for free yielding movement in a vertical plane to and away from the lower of said rolls in response to each nut entering said bite whereby the gap between said rolls will vary automatically according to the size of each nut in the bite of said rolls, the lower of said rolls being rotatable about a fixed axis,
   (e) power means drivingly connected to said rolls for rotating said rolls in opposite directions,
   (f) said mounting means including a bracket, one end of said bracket rotatably supporting said upper roll and the opposite end of said bracket mounted to said apparatus for free pivotal movement within a predetermined angle about an axis in spaced parallel relation to the axis of said upper roll to thereby permit limited movement of said one end of said bracket together with said upper roll to and away from said lower roll.

2. Apparatus according to claim 1 including stop means operatively connected to said bracket for limiting the movement of said bracket in a direction towards said lower roll.

3. Apparatus according to claim 1 wherein said power means includes a drive shaft mounted in spaced parallel relation to the axis of said upper roll, said bracket pivotally mounted at one end to said drive shaft, a first pulley drivingly engaging said upper roll and a belt drivingly connected to said first and second pulleys.

4. Apparatus according to claim 3 including a fixed member disposed below said bracket and an adjustment screw threaded to said bracket and adapted to engage said member in the absence of a nut between said rolls.

5. Apparatus according to claim 3 wherein said upper roll includes resilient cushioning means about its periphery and said lower roll is fabricated from a rigid material and having a groove formed about its periphery.

* * * * *